(12) United States Patent
Yoo et al.

(10) Patent No.: US 12,555,857 B2
(45) Date of Patent: Feb. 17, 2026

(54) BATTERY PACK

(71) Applicant: LG ENERGY SOLUTION, LTD., Seoul (KR)

(72) Inventors: Hyongseok Yoo, Daejeon (KR); Donghyun Kim, Daejeon (KR); Soeun Rhim, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 258 days.

(21) Appl. No.: 18/027,842

(22) PCT Filed: Feb. 24, 2022

(86) PCT No.: PCT/KR2022/002701
§ 371 (c)(1),
(2) Date: Mar. 22, 2023

(87) PCT Pub. No.: WO2022/220396
PCT Pub. Date: Oct. 20, 2022

(65) Prior Publication Data
US 2023/0344055 A1    Oct. 26, 2023

(30) Foreign Application Priority Data
Apr. 13, 2021 (KR) .......................... 10-2021-0047658

(51) Int. Cl.
*H01M 50/244*    (2021.01)
*H01M 10/613*    (2014.01)
*H01M 50/242*    (2021.01)

(52) U.S. Cl.
CPC ....... *H01M 50/244* (2021.01); *H01M 10/613* (2015.04); *H01M 50/242* (2021.01)

(58) Field of Classification Search
CPC ........ B60K 2001/0438; H01M 10/613; H01M 50/242; H01M 50/244
See application file for complete search history.

(56) References Cited

U.S. PATENT DOCUMENTS 10,431,802 B2 * 10/2019 Fees .................... H01M 10/625
10,665,913 B2 *  5/2020 Syed ................... H01M 50/121
(Continued)

FOREIGN PATENT DOCUMENTS

CN    209249493 U    8/2019
CN    209544445 U    10/2019
(Continued)

OTHER PUBLICATIONS

International Search Report for PCT/KR2022/002701 mailed on Jun. 15, 2022.
(Continued)

*Primary Examiner* — Jeffrey J Restifo
(74) *Attorney, Agent, or Firm* — Birch, Stewart, Kolasch & Birch, LLP

(57) ABSTRACT

A battery pack prevents or reduces an explosion by minimizing impact and heat transfer between a plurality of embedded battery modules. The battery pack includes a first battery module and a second battery module aligned in a first direction; a crush beam unit provided between the first battery module and the second battery module; and a housing for accommodating the first battery module, the second battery module, and the crush beam unit therein. The crush beam unit includes a first insulation pad facing the first battery module, and a second insulation pad facing the second battery module.

14 Claims, 6 Drawing Sheets

(56) References Cited

U.S. PATENT DOCUMENTS

| | | | |
|---|---|---|---|
| 11,133,554 B2* | 9/2021 | Shi | H01M 50/264 |
| 12,176,549 B2* | 12/2024 | Grenier | H01M 10/058 |
| 2015/0194641 A1 | 7/2015 | Tsuji et al. | |
| 2020/0152932 A1 | 5/2020 | Ozawa et al. | |
| 2021/0074960 A1 | 3/2021 | Stude et al. | |
| 2021/0074979 A1 | 3/2021 | Kwak et al. | |
| 2021/0351455 A1 | 11/2021 | Kim et al. | |
| 2022/0115737 A1 | 4/2022 | Shin et al. | |
| 2022/0194489 A1* | 6/2022 | Roche | B60K 17/22 |
| 2022/0336902 A1* | 10/2022 | Park | H01M 10/625 |
| 2022/0376347 A1* | 11/2022 | Park | H01M 50/593 |
| 2023/0124905 A1* | 4/2023 | Vizzini | H01M 10/647 |
| | | | 180/68.5 |
| 2023/0291068 A1* | 9/2023 | Lee | H01M 50/367 |
| 2023/0299440 A1* | 9/2023 | Liang | H01M 50/3425 |
| | | | 429/56 |
| 2023/0344055 A1* | 10/2023 | Yoo | H01M 50/291 |
| 2024/0170793 A1* | 5/2024 | Lee | H01M 50/291 |
| 2024/0178474 A1* | 5/2024 | Kim | H01M 10/647 |
| 2024/0178517 A1* | 5/2024 | Chen | H01M 50/682 |
| 2024/0313302 A1* | 9/2024 | Williams | H01M 10/6554 |
| 2024/0387897 A1* | 11/2024 | Kim | H01M 50/383 |
| 2025/0007085 A1* | 1/2025 | Park | H01M 10/658 |
| 2025/0055074 A1* | 2/2025 | Saripella | H01M 10/658 |
| 2025/0062486 A1* | 2/2025 | Huang | H01M 50/262 |
| 2025/0070352 A1* | 2/2025 | Zhou | H01M 10/647 |
| 2025/0070432 A1* | 2/2025 | Qian | H01M 50/103 |
| 2025/0079592 A1* | 3/2025 | An | H01M 50/258 |
| 2025/0105427 A1* | 3/2025 | Park | H01M 50/249 |

FOREIGN PATENT DOCUMENTS

| | | |
|---|---|---|
| CN | 110911604 A | 3/2020 |
| CN | 210706377 U | 6/2020 |
| CN | 111682138 A | 9/2020 |
| CN | 112531246 A | 3/2021 |
| CN | 212751062 U | 3/2021 |
| DE | 10 2019 105 810 A1 | 9/2020 |
| GB | 2 304 451 A | 3/1997 |
| JP | 6209164 B2 | 10/2017 |
| JP | WO2018/173860 A1 | 9/2018 |
| JP | 2019-169337 A | 10/2019 |
| JP | 2021-507483 A | 2/2021 |
| KR | 10-2019-0074516 A | 6/2019 |
| KR | 10-2020-0033774 A | 3/2020 |
| KR | 10-2021-0004189 A | 1/2021 |
| KR | 10-2021-0029126 A | 3/2021 |

OTHER PUBLICATIONS

European Search Report for European Application No. 22788253.7, dated Feb. 26, 2024.

Japanese Office Action for Japanese Application No. 2023-516781, dated Apr. 22, 2024, with English translation.

* cited by examiner

BATTERY PACK

TECHNICAL FIELD

This application claims the benefit of priority based on Korean Patent Application No. 10-2021-0047658 filed on Apr. 13, 2021, the entire disclosure of which is incorporated herein by reference for all purposes.

The present disclosure relates to a battery pack, and more specifically, to a battery pack for preventing or reducing explosion by minimizing shock and heat transfer among a plurality of embedded battery modules.

BACKGROUND ART

Since a battery pack is used in various fields such as electric vehicles and also applied to transportation means or mobile devices, the environment to which the battery pack is applied may involve consistent transfer of shock to the battery pack. In addition, heat generated in the battery pack itself or heat received from surrounding environment may cause explosion of the battery pack.

A battery module is formed of a plurality of battery cells, and a plurality of battery modules may be embedded in the battery pack. This structure may be for safe, efficient management of a large number of battery cells.

In case of simultaneous ignition of the plurality of battery modules embedded in the battery pack, a strong explosion may occur, leading to a serious accident.

Therefore, there is a need for prevention of an accident in the battery pack in advance or minimization of the extent of accident by blocking or delaying shock transfer such as heat or vibration among the battery modules embedded in the battery pack.

DISCLOSURE

Technical Problem

The present disclosure relates to a battery pack and may be to provide a battery pack for preventing or reducing explosion by minimizing shock and heat transfer among a plurality of battery modules embedded therein.

Technical objects to be achieved by the present disclosure are not limited to the technical problems mentioned above, and other technical objects not mentioned will be clearly understood from the description below by those of ordinary skill in the art to which the present disclosure pertains.

Technical Solutions

A battery pack of example embodiments of the present disclosure includes a first battery module and a second battery module aligned along a first direction; a crush beam provided between the first battery module and the second battery module; and a housing accommodating the first battery module, the second battery module, and the crush beam therein, wherein the crush beam includes a first insulation pad facing the first battery module and a second insulation pad facing the second battery module.

Advantageous Effects

According to a battery pack of example embodiments of the present disclosure, it is possible to inhibit transfer of shock and heat among battery modules by providing a crush beam having a heat insulation pad between the battery modules. Thus, even if a single battery module is heated up or explodes, it is possible to prevent or delay chain explosions of surrounding battery modules.

A battery pack of example embodiments of the present disclosure is capable of stably operating even in the environment in which heat and vibration are consistently generated.

BEST MODE

Figure 1:
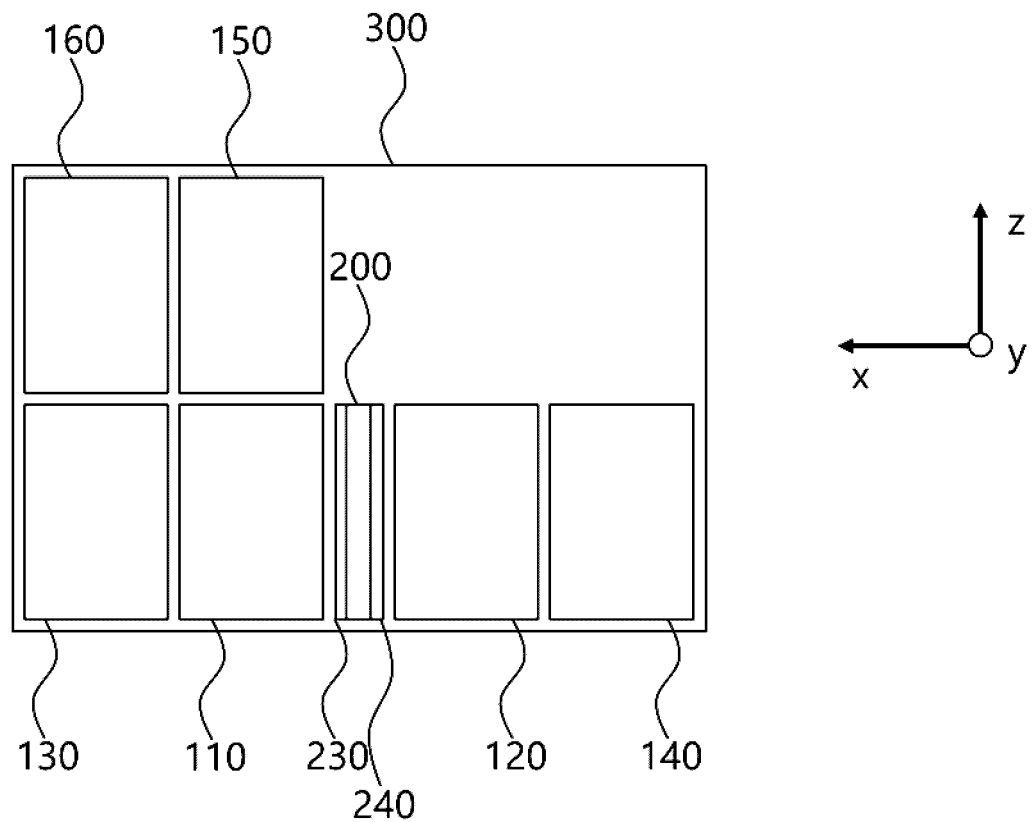
FIG. 1 is a schematic diagram illustrating a battery pack of an example embodiment of the present disclosure.

A battery pack of an example embodiment of the present disclosure includes:
  a first battery module and a second battery module aligned along a first direction;
  a crush beam unit provided between the first battery module and the second battery module; and
  a housing configured to accommodate the first battery module, the second battery module, and the crush beam unit therein,
  wherein the crush beam unit may include a first insulation pad facing the first battery module and a second insulation pad facing the second battery module.

In the battery pack of the present disclosure, the first insulation pad or the second insulation pad may include a mica sheet layer and a ceramic paper layer.

In the battery pack of the present disclosure, the first insulation pad or the second insulation pad may be formed by laminating the ceramic paper layer within the two mica sheet layers.

In the battery pack of the present disclosure, the thickness of the two mica sheet layers may be 0.05 mm to 0.5 mm, and the thickness of the ceramic paper layer may be 1 mm to 5 mm.

In the battery pack of the present disclosure, the crush beam unit may include a first frame part having one side to which the first insulation pad is attached; and a second frame part having one side facing the other side of the first frame part and the other side to which the second insulation pad is attached, and the first frame part and the second frame part may be coupled such that the other side of the first frame part and the one side of the second frame part are spaced apart from each other.

In the battery pack of the present disclosure, when the first direction is a direction perpendicular to a vertical direction and a second direction is perpendicular to the first direction and the vertical direction, the first frame part may include a first body part formed of a plate which is planar and perpendicular to the first direction; and a pair of first wing parts formed to protrude from both ends of first body part in the second direction, respectively, and the pair of first wing parts may be coupled to an inner surface of the housing.

In the battery pack of the present disclosure, the second frame part may include a second body part formed of a plate which is planar and perpendicular to the first direction, and a pair of second wing parts formed to protrude from both ends of the second body part in the second direction, respectively, an end of the first wing part may be bent in the first direction to form a first coupling region, and the second wing part may be coupled to the first coupling region.

The battery pack of the present disclosure may further include:
- a third battery module and a fourth battery module aligned along the first direction together with the first battery module and the second battery module;
- a fifth battery module positioned on the first battery module; and
- a sixth battery module positioned on the third battery module.

In the battery pack of the present disclosure, one side of the first battery may be in close contact with the third battery module, the other side of the first battery may be in close contact with the first insulation pad, one side of the second battery may be in close contact with the second insulation pad, and the other side of the second battery may be in close contact with the fourth battery module.

The battery pack of the present disclosure may further include a crush layer stacked on upper ends of the first battery module and the third battery module, and the fifth battery module and the sixth battery module may be stacked on an upper surface of the crush layer.

In the battery pack of the present disclosure, the crush layer may include a first layer having an upper surface coupled to lower ends of the fifth battery module and the sixth battery module, and a second layer having a lower surface coupled to upper ends of the first battery module and the third battery module, and the first layer and the second layer may be coupled in a state where a lower surface of the first layer and an upper surface of the second layer are spaced apart from each other.

In the battery pack of the present disclosure, the first frame part may further include a support part protruding from an upper end of the first body part, and the support part may be coupled with the crush layer.

MODES FOR CARRYING OUT INVENTION

Hereinafter, an example embodiment according to the present disclosure will be described in detail with reference to the accompanying drawings. Here, the size or shape of components shown in the drawings may be exaggerated for clarity and convenience of explanation. In addition, terms specifically defined in consideration of the configuration and operation of the present disclosure may vary depending on the intention or custom of a user or operator. Definitions of these terms should be made based on the context throughout this specification.

In the description of the present disclosure, it should be noted that orientation or positional relationships indicated by the terms such as "center", "upper", "lower", "left", "right", "vertical", "horizontal", "inside", "outside", "one side", and "the other side" are based on orientation or positional relationships shown in the drawings or orientation or positional relationships usually of disposition when a product according to the present disclosure is used, are merely for the description and brief illustration of the present disclosure, and should not be construed as limiting the present disclosure because they are not suggesting or implying that the indicated device or element must be configured or operated in the specified orientation with the specified orientation.

Figure 2:
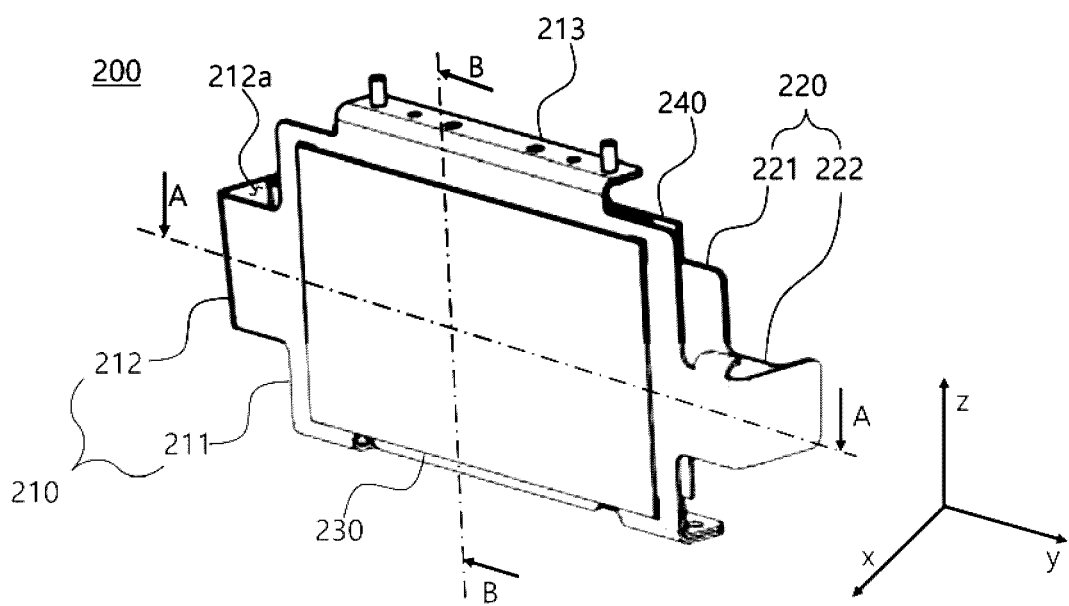
FIG. 2 is a perspective view illustrating a crush beam unit.
Figure 3:
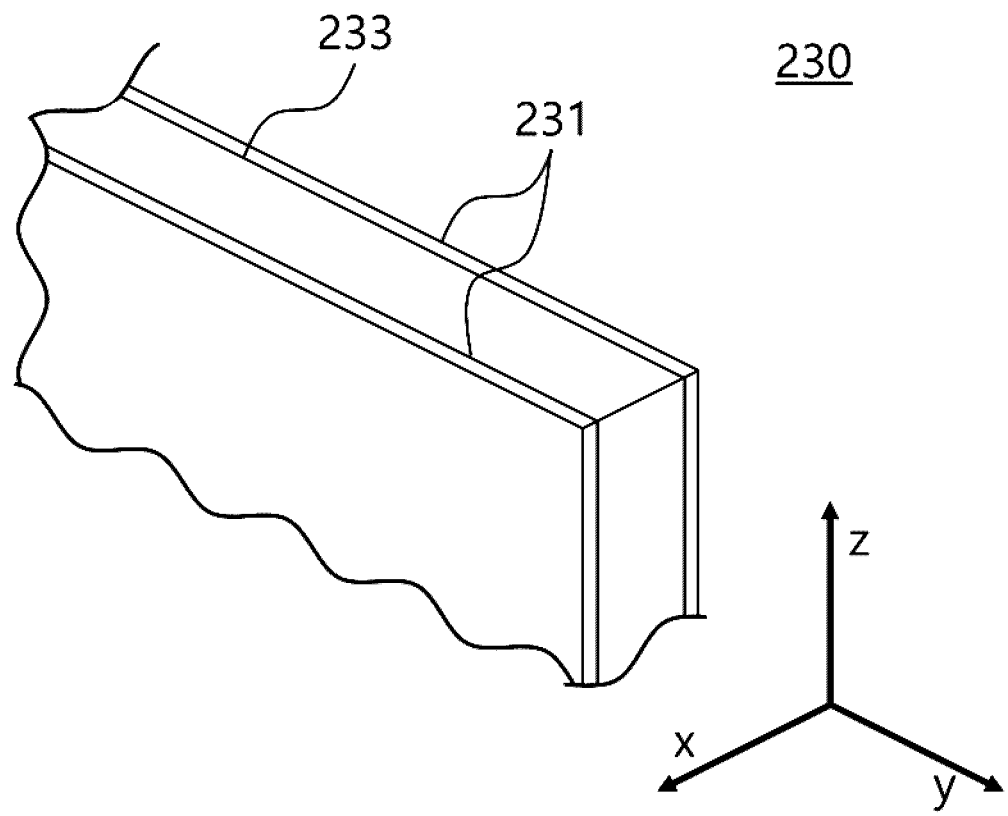
FIG. 3 is a perspective view illustrating a first insulation pad.
Figure 4:
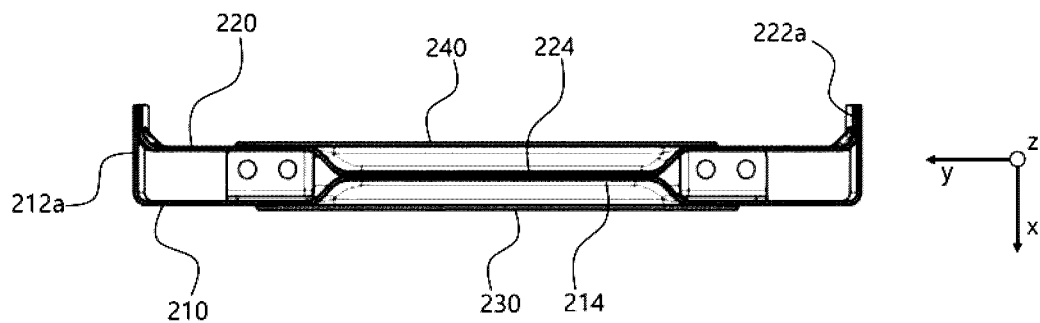
FIG. 4 is a cross-sectional view taken along a line A-A of FIG. 2.
Figure 5:
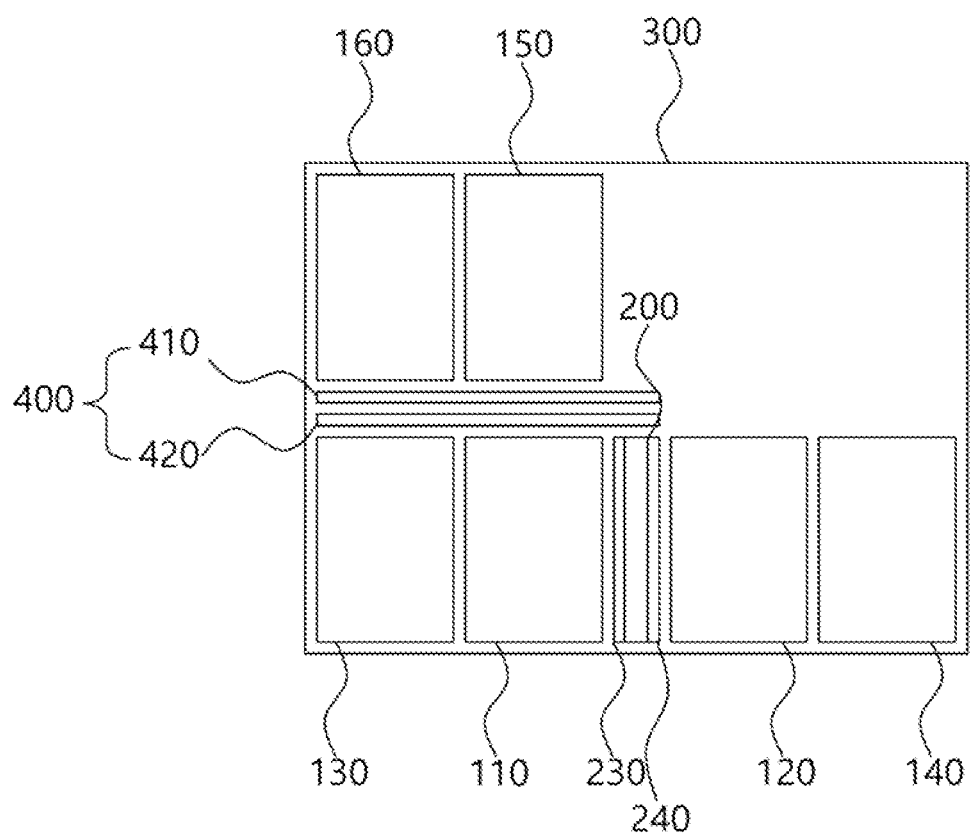
FIG. 5 is a schematic diagram illustrating another example embodiment of the battery pack of the present disclosure.
Figure 6:
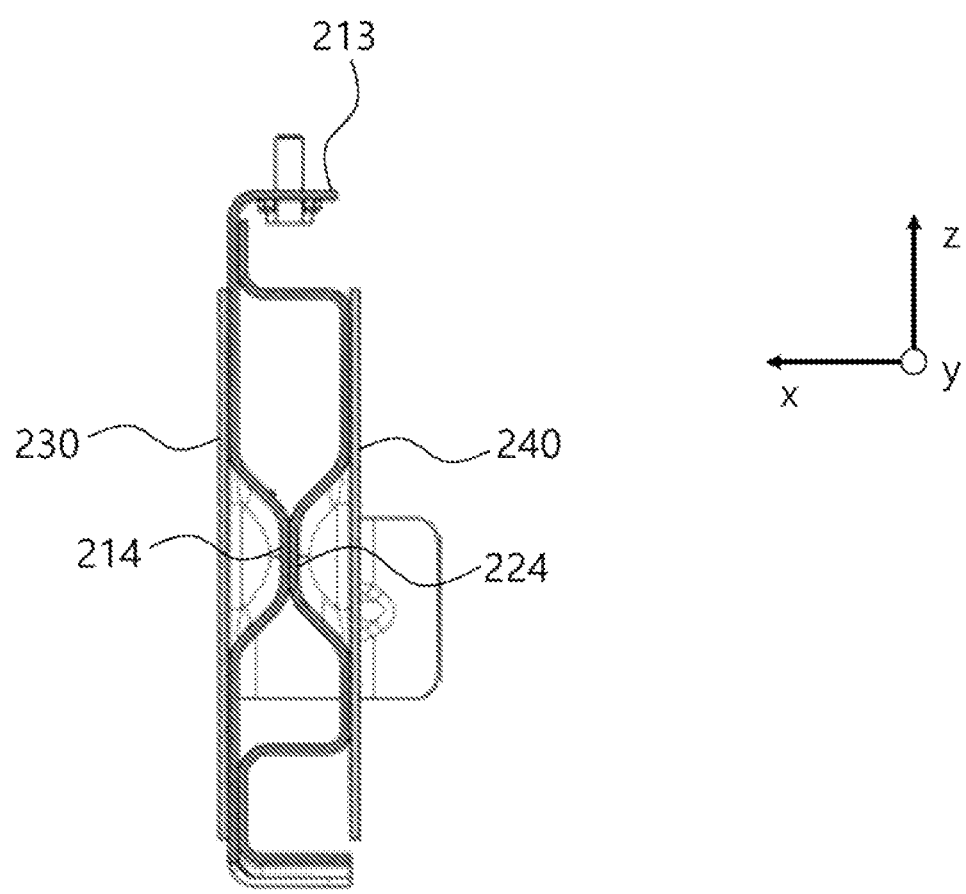
FIG. 6 is a cross-sectional view illustrating a cross section B-B of FIG. 2.
Figure 7:
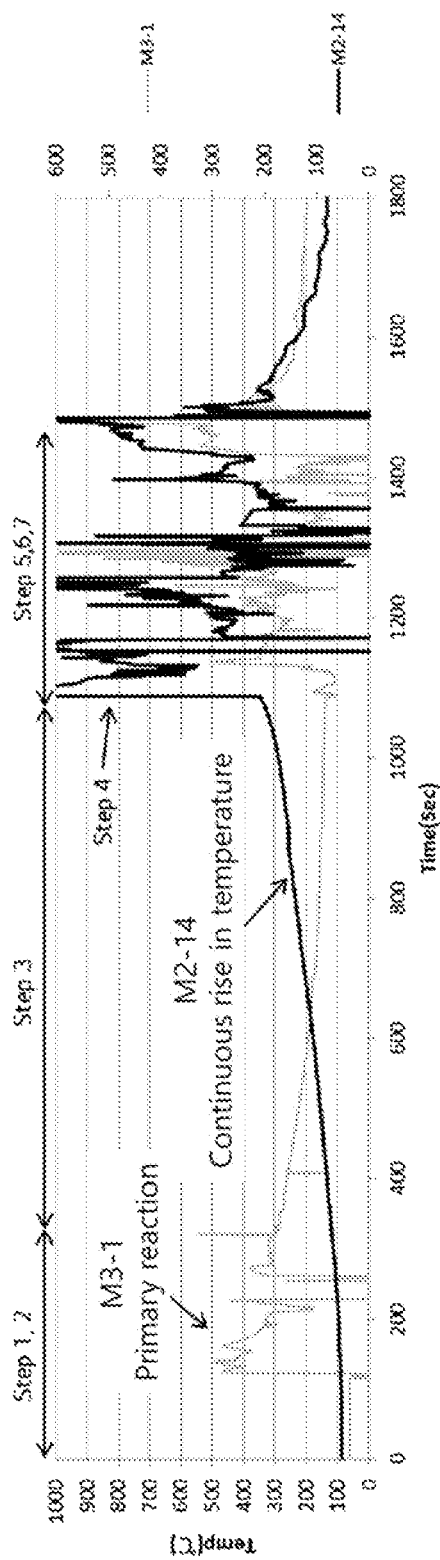
FIG. 7 is a graph illustrating temperature of each battery module over time in a battery pack without a first insulation pad and a second insulation pad.
Figure 8:
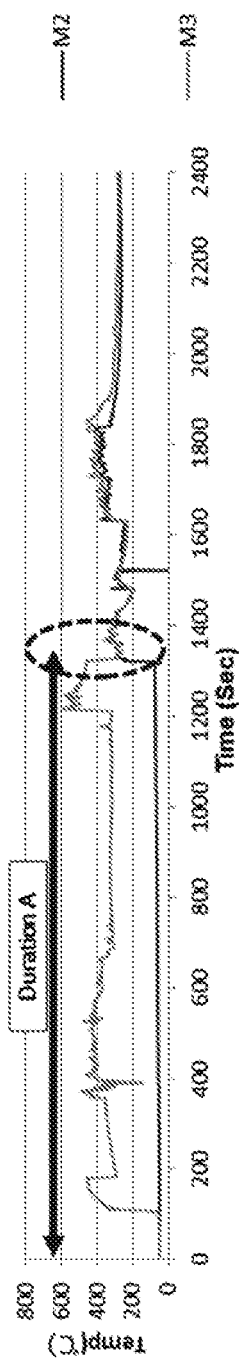
FIG. 8 is a graph illustrating temperature of each battery module over time in a battery pack with the first insulation pad and the second insulation pad.

FIG. 1 is a schematic diagram illustrating a battery pack of an example embodiment of the present disclosure. FIG. 2 is a perspective view illustrating a crush beam unit. FIG. 3 is a perspective view illustrating a first insulation pad 230. FIG. 4 is a cross-sectional view taken along a line A-A of FIG. 2. FIG. 5 is a schematic diagram illustrating another example embodiment of the battery pack of the present disclosure. FIG. 6 is a cross-sectional view illustrating a cross section B-B of FIG. 2. FIG. 7 is a graph illustrating temperature of each battery module over time in a battery pack without the first insulation pad 230 and a second insulation pad 240. FIG. 8 is a graph illustrating temperature of each battery module over time in a battery pack with the first insulation pad 230 and the second insulation pad 240.

Hereinafter, the battery pack of an example embodiment of the present disclosure will be described in detail with reference to FIGS. 1 to 8.

Referring to FIGS. 1 and 2, the battery pack of an example embodiment of the present disclosure includes
- a first battery module 110 and a second battery module 120 aligned along a first direction;
- a crush beam unit 200 provided between the first battery module 110 and the second battery module 120; and
- a housing 300 configured to accommodate the first battery module 110, the second battery module 120, and the crush beam unit 200 therein, and
- the crush beam unit 200 may include the first insulation pad 230 facing the first battery module 110 and the second insulation pad 240 facing the second battery module 120.

The battery module may be a bundle of a predetermined number of battery cells put in a frame in order to protect the battery cells from external shock, heat, and vibration.

The battery cell is a basic unit of a battery to be used by charging or discharging electrical energy, and may be manufactured by accommodating a positive electrode, a negative electrode, a separator, and an electrolyte in a battery case.

A battery pack may be the final form of a battery system mounted on an electric vehicle. The battery pack may include various control and protection systems such as a battery management system (BMS) and a cooling system along with a plurality of battery modules.

The battery pack of an example embodiment of the present disclosure may include a plurality of battery modules which are accommodated in the housing 300 while being aligned along the first direction. When one of the aligned battery modules is referred to as the first battery module 110 and a battery module adjacent to the first battery module 110 is referred to as the second battery module 120, the crush beam unit 200 having the first insulation pad 230 and the second insulation pad 240 may be inserted between the first battery module 110 and the second battery module 120.

The first direction may be an x-axis direction in FIGS. 1 to 6. A second direction to be described later may be a y-axis direction in FIGS. 1 to 6, and a vertical direction may be a z-axis direction. In the battery pack of the present disclosure, the battery cell may be provided in a planar shape perpendicular to the first direction, and a plurality of battery cells may be embedded in a stacked form along the first direction in the battery module such that surfaces of the respective battery cells face each other. The crush beam unit 200 may be disposed between a plurality of the battery modules provided along the first direction to mitigate the shock.

As shown in FIG. 3, the first insulation pad 230 or the second insulation pad 240 may include a mica sheet layer and a ceramic paper layer 233.

Mica sheet is a sheet having electrical insulation and heat resistance, is usable in a temperature of about 500° C., and may stand heat up to approximately 800° C.

The ceramic paper layer 233 may be formed in a paper form through addition of a binder to ceramic fibers (e.g., superwool bulk fiber). The ceramic fiber may include a mixture of CaO and MgO and $SiO_2$. More specifically, the ceramic paper layer 233 may include 30 to 40 wt % of the mixture of CaO and MgO and 60 to 70 wt % of $SiO_2$ based on the total weight.

As shown in FIG. 3, the first insulation pad 230 or the second insulation pad 240 may be formed by laminating the ceramic paper layer 233 between the two mica sheet layers 231. In this case, the thickness of the two mica sheet layers 231 may be 0.05 mm to 0.5 mm, and that of the ceramic paper layer 233 may be 1 mm to 5 mm. For example, the mica sheet layer 231 may be formed to have a thickness of 0.1 mm, and the ceramic paper layer 233 to have a thickness of 3 mm. With the laminated structure as described above, it is possible to absorb swing and tolerance of the battery module. The mica sheet layer 231 blocks, as an insulating material, disallowed electrical connections between adjacent structures and may support the ceramic paper layer 233 to maintain a constant shape due to relatively high rigidity. The ceramic paper layer 233 exhibits, as an insulating material, an insulation effect which increases as the thickness increases. However, the thickness may be determined in consideration of structural conditions.

As shown in FIGS. 2 and 4, the crush beam unit 200 may further include:
a first frame part 210 having one side to which the first insulation pad 230 is attached; and
a second frame part 220 having one side facing the other side of the first frame part 210 and the other side to which the second insulation pad 240 is attached.

In other words, the first frame part 210 may be in close contact with a side of the first battery module 110 with the first insulation pad 230 interposed therebetween, and the second frame part 220 may be in close contact with a side of the second battery module 120 with the second insulation pad 240 interposed therebetween.

The first frame part 210 and the second frame part 220 may be coupled such that the other side of the first frame part 210 and the one side of the second frame part 220 are spaced apart from each other. Between the other side of the first frame part 210 and the one side of the second frame part 220, a supporting means for maintaining a distance between the two surfaces may be provided. However, the entire space between the two surfaces is not completely filled. Owing to the structure above, it is possible to minimize the transfer of heat generated in a single battery module to another battery module along the structure of the crush beam unit 200.

As shown in FIG. 4, when the first direction is perpendicular to the vertical direction and a direction perpendicular to the first direction and the vertical direction is referred to as the second direction, the first frame part 210 may include a first body part 211 formed of a plate which is planar and perpendicular to the first direction, and a pair of first wing parts 212 formed to protrude from both ends of first body part 211 in the second direction, respectively, and the pair of first wing parts 212 may be coupled to an inner surface of the housing 300. In other words, each of the first wing parts 212 is formed at each of both edges of the first body part 211, and the wing parts may be fixed to the housing 300, thereby preventing the crush beam unit 200 from swinging inside the housing 300.

The second frame part 220 may include a second body part 221 formed of a plate which is planar and perpendicular to the first direction and a pair of second wing parts 222 formed to protrude from both ends of the second body part 221 in the second direction, respectively.

An end of the first wing part 212 may be bent in the first direction to form a first coupling region 212a, and the second wing part 222 may be coupled to the first coupling region 212a.

An outer surface of the first coupling region 212a formed by bending the first wing part 212 may be coupled to the inner surface of the housing 300, and the second wing part 222 of the second frame part 220 may be coupled to the first coupling region 212a. An end of the second wing part 222 is also bent to be formed as a second coupling region 222a, and the second coupling region 222a may be coupled to the first coupling region 212a.

As shown in FIGS. 4 and 6, the first insulation pad 230 may be coupled to the first body part 211, and the second insulation pad 240 may be coupled to the second body part 221. A first concave part 214 may be formed in a partial region of the first body part 211 facing the first insulation pad 230, and a second concave part 224 may be formed in a partial region of the second body part 221 facing the second insulation pad 240. The first concave part 214 and the second concave part 224 may be formed at positions facing each other. The other side of the first concave part 214 and the other side of the second concave part 224 may play a role as a support to help the first frame part 210 and the second frame part 220 supported in a state of being spaced apart from each other by a predetermined distance when the first frame part 210 and the second frame part 220 are coupled to each other. In addition, the first concave part 214 and the second concave part 224 may increase the insulation effect by minimizing the area at which the first insulation pad 230 and the second insulation pad 240 come in contact with the first body part 211 and the second body 221.

As shown in FIG. 1, the battery pack of an example embodiment of the present disclosure may include at least six battery modules. Specifically, the battery pack of an example embodiment of the present disclosure may further include a third battery module 130 and a fourth battery module 140 aligned along the first direction together with the first battery module 110 and the second battery module 120; a fifth battery module 150 positioned on the first battery module 110; and a sixth battery module 160 positioned on the third battery module 130. In other words, in the battery pack of an example embodiment of the present disclosure, a plurality of battery modules may be arranged in a two-layer structure. The first battery module 110, the second battery module 120, the third battery module 130, and the fourth battery module 140 may be disposed in the lower layer, and the fifth battery module 150 and the sixth battery module 160 may be disposed in the upper layer.

Specifically, the first battery module 110, the second battery module 120, the third battery module 130, the fourth battery module 140, and the crush beam unit 200 may be disposed in the lower layer, so that one side of the first battery module is in close contact with the third battery module 130, the other side of the first battery module with the first insulation pad 230, one side of the second battery module with the second insulation pad 240, and the other side of the second battery module with the fourth battery module 140. In other words, inside the housing 300 of the battery pack of an example embodiment of the present disclosure, the third battery module 130, the first battery module 110, the crush beam unit 200, the second battery module 120, and the fourth battery modules 140 may be disposed in order along the first direction in the lower layer.

As shown in FIG. 5, the battery pack of an example embodiment of the present disclosure may further include a crush layer 400 stacked on upper ends of the first battery module 110 and the third battery module 130, and the fifth battery module 150 and the sixth battery module 160 may be stacked on an upper surface of the crush layer 400.

As shown in FIGS. 5 and 6, the crush layer 400 may include a first layer 410 having an upper surface coupled to lower ends of the fifth battery module 150 and the sixth battery module 160, and a second layer 420 having a lower surface coupled to upper ends of the first battery module 110 and the third battery module 130, wherein the first layer 410 and the second layer 420 may be coupled in a state where a lower surface of the first layer 410 and an upper surface of the second layer 420 are spaced apart from each other. The first frame part 210 may further include a support part 213 protruding from an upper end of the first body part 211, and the support part 213 may be coupled with the crush layer 400. Transfer of vibration and heat among layers may be reduced by the crush layer 400.

FIGS. 7 and 8 are graphs illustrating changes in temperature of each battery module over time in a situation with an explosion taken place in the first battery module 110.

FIG. 7 is a graph indicating temperature of each battery module over time in the battery pack without the first insulation pad 230 and the second insulation pad 240. In FIG. 7, a graph indicating the temperature of the first battery module 110 is M3-1, and a graph indicating the temperature of the second battery module 120 is M2-14. The temperature gradually increased in the second battery module 120 without a rapid change in the temperature before about 18 minutes, but a rapid change in the temperature may be observed after about 18 minutes. As can be seen in the graph of FIG. 7, the structural features of the crush beam unit 200 delay heat transfer.

FIG. 8 is a graph illustrating temperature of each battery module over time in the battery pack with the first insulation pad 230 and the second insulation pad 240. In FIG. 8, a graph indicating the temperature of the first battery module 110 is M3, and a graph indicating the temperature of the second battery module 120 is M2. Referring to FIG. 8, the explosion was delayed longer than 22 minutes when the first insulation pad 230 and the second insulation pad 240 were provided. In other words, it can be seen that the first insulation pad 230 and the second insulation pad 240 further maximize the heat transfer delay effect of the crush beam unit 200.

Although the example embodiments according to the present disclosure have been described above, these are merely exemplary, and those skilled in the art will understand that various modifications and equivalent ranges of the example embodiments are possible therefrom. Accordingly, the scope for true technical protection of the present disclosure should be defined by the appended claims.

[Description of Symbols]

| | | | |
|---|---|---|---|
| 110 | First battery module | 120 | Second battery module |
| 130 | Third battery module | 140 | Fourth battery module |
| 150 | Fifth battery module | 160 | Sixth battery module |
| 200 | Crush beam unit | 210 | First frame part |
| 211 | First body part | 212 | First wing part |
| 212a | First coupling region | 213 | Support part |
| 220 | Second frame part | 221 | Second body part |
| 222 | Second wing part | 222a | Second coupling region |
| 230 | First insulation pad | 231 | Mica sheet layer |
| 233 | Ceramic paper layer | 240 | Second insulation pad |
| 300 | Housing | 400 | Crush layer |
| 410 | First layer | 420 | Second layer |

INDUSTRIAL APPLICABILITY

According to a battery pack of example embodiments of the present disclosure, it is possible to inhibit transfer of shock and heat among battery modules by providing a crush beam having a heat insulation pad between the battery modules. Thus, even if a single battery module is heated up or explodes, it is possible to prevent or delay chain explosions of surrounding battery modules.

A battery pack of example embodiments of the present disclosure is capable of stably operating even in the environment in which heat and vibration are consistently generated.

What is claimed is:

1. A battery pack comprising:
   a first battery module and a second battery module aligned along a first direction;
   a crush beam provided between the first battery module and the second battery module; and
   a housing configured to accommodate the first battery module, the second battery module, and the crush beam therein,
   wherein the crush beam comprises a first insulation pad facing the first battery module and a second insulation pad facing the second battery module.

2. The battery pack of claim 1, wherein the first insulation pad or the second insulation pad comprises a mica sheet layer and a ceramic paper layer.

3. The battery pack of claim 1, wherein the first insulation pad or the second insulation pad is formed by laminating a ceramic paper layer between two mica sheet layers.

4. The battery pack of claim 3, wherein a thickness of the two mica sheet layers is 0.05 mm to 0.5 mm, and
   wherein the thickness of the ceramic paper layer is 1 mm to 5 mm.

5. The battery pack of claim 1, wherein the crush beam further comprises:
   a first frame having a first side to which the first insulation pad is attached; and
   a second frame having a first side facing a second side of the first frame and a second side to which the second insulation pad is attached,
   wherein the first frame and the second frame are coupled such that the second side of the first frame and the first side of the second frame are spaced apart from each other.

6. The battery pack of claim 5, wherein the first direction is perpendicular to a vertical direction and a second direction is perpendicular to the first direction and the vertical direction, and
   wherein the first frame comprises:

a first body formed of a plate which is planar and perpendicular to the first direction; and a pair of first wings formed to protrude from both ends of the first body in the second direction, respectively, wherein the pair of first wings are coupled to an inner surface of the housing.

7. The battery pack of claim 6, wherein the second frame comprises:

a second body formed of a plate which is planar and perpendicular to the first direction; and a pair of second wings formed to protrude from both ends of the second body in the second direction, respectively, wherein an end of each of the first wings is bent in the first direction to form a first coupling region, and wherein each of the second wings is coupled to the first coupling region.

8. The battery pack of claim 7, further comprising:

a third battery module and a fourth battery module aligned along the first direction together with the first battery module and the second battery module;

a fifth battery module positioned on the first battery module; and a sixth battery module positioned on the third battery module, wherein a first side of the first battery module is in close contact with the third battery module, wherein a second side of the first battery module is in close contact with the first insulation pad, wherein a first side of the second battery module is in close contact with the second insulation pad, and wherein a second side of the second battery module is in close contact with the fourth battery module.

9. The battery pack of claim 8, further comprising:

a crush layer stacked on upper ends of the first battery module and the third battery module, wherein the fifth battery module and the sixth battery module are stacked on an upper surface of the crush layer.

10. The battery pack of claim 9, wherein the crush layer comprises:

a first layer having an upper surface coupled to lower ends of the fifth battery module and the sixth battery module; and a second layer having a lower surface coupled to upper ends of the first battery module and the third battery module, and wherein the first layer and the second layer are coupled in a state where a lower surface of the first layer and an upper surface of the second layer are spaced apart from each other.

11. The battery pack of claim 9, wherein the first frame further comprises a support protruding from an upper end of the first body, and wherein the support is coupled with the crush layer.

12. The battery pack of claim 5, wherein the first frame comprises:

a first body formed of a plate; and a first concave part extending toward the second frame, and wherein the second frame comprises:

a second body formed of a plate; and a second concave part extending toward the first frame.

13. The battery pack of claim 12, wherein the first concave part directly contacts the second concave part.

14. The battery pack of claim 12, wherein the first concave part is in a central portion of the first body and the second concave part is in a central portion of the second body.

* * * * *